(12) United States Patent
Sakamoto et al.

(10) Patent No.: US 8,588,234 B2
(45) Date of Patent: Nov. 19, 2013

(54) DATA PROCESSING APPARATUS, METHOD, AND COMPUTER-READABLE STORAGE MEDIUM FOR DYNAMICALLY CONTROLLING A TRANSMISSION INTERVAL

(75) Inventors: Isao Sakamoto, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 12/949,030

(22) Filed: Nov. 18, 2010

(65) Prior Publication Data

US 2011/0149974 A1 Jun. 23, 2011

(30) Foreign Application Priority Data

Dec. 18, 2009 (JP) ................................. 2009-288413

(51) Int. Cl.
*H04L 12/28* (2006.01)
(52) U.S. Cl.
USPC ........ 370/394; 370/222; 370/258; 370/395.4; 370/400; 370/401; 709/223; 710/107; 712/225
(58) Field of Classification Search
None
See application file for complete search history.

(56) References Cited

U.S. PATENT DOCUMENTS

| | | | |
|---|---|---|---|
| 5,155,858 A * | 10/1992 | DeBruler et al. | ............. 718/105 |
| 7,321,596 B2 | 1/2008 | Ohnishi | |
| 2004/0158637 A1 * | 8/2004 | Lee | ............................... 709/226 |
| 2005/0259651 A1 | 11/2005 | Yashima | |
| 2006/0070058 A1 * | 3/2006 | Menahemi et al. | ........... 717/171 |
| 2010/0235609 A1 | 9/2010 | Inoue et al. | |
| 2010/0293310 A1 | 11/2010 | Kimura et al. | |

FOREIGN PATENT DOCUMENTS

| | | |
|---|---|---|
| CN | 1402478 A | 3/2003 |
| CN | 1700673 A | 11/2005 |
| EP | 0161825 A2 | 11/1985 |
| JP | 10167560 A | 6/1998 |
| JP | 2007316699 A | 12/2007 |

OTHER PUBLICATIONS

Office Action issued on Apr. 16, 2013, in counterpart Chinese application No. 201010610306.0.

* cited by examiner

*Primary Examiner* — Nicholas Sloms
*Assistant Examiner* — N S
(74) *Attorney, Agent, or Firm* — Fitzpatrick, Cella, Harper & Scinto

(57) ABSTRACT

A data processing apparatus includes a receiving unit for receiving a packet, a determining unit for determining whether to process the packet data by a self-module, based on first information contained in the packet and indicating a processing order, a processing unit for processing the data if the data should be processed by the self-module, a generating unit for generating a packet containing the first information, and one of the processed data, and second information indicating that the data to be processed is stalled, and a transmitting unit for transmitting, according to the first information, the packet to a module expected to process the packet next. The transmitting unit performs the transmission at a transmission interval longer than a predetermined time, if the first and second information indicate that the packet contains data which should be processed by a module next to the self-module in processing order and is stalled.

5 Claims, 2 Drawing Sheets

DATA PROCESSING APPARATUS, METHOD, AND COMPUTER-READABLE STORAGE MEDIUM FOR DYNAMICALLY CONTROLLING A TRANSMISSION INTERVAL

BACKGROUND OF THE INVENTION

1. Field of the Invention

The present invention relates to a data processing apparatus, data processing method, and computer-readable storage medium.

2. Description of the Related Art

Conventionally, there is a data processing apparatus for performing data processing by connecting a plurality of modules by a unidirectional ring bus. For example, an apparatus in which each module includes one or more buffer or memory stages, and packets equal in number to the modules are allowed to exist in a ring bus and transferred in parallel between the modules has been proposed (Japanese Patent Laid-Open No. 10-167560).

Also, to improve the overall processing performance of the apparatus, a method in which priority is given to a packet containing data processed by a self-module and data to be processed by another module, each module determines the priority, and a packet that has a high priority is given preference for transfer has been proposed (Japanese Patent Laid-Open Nos. 10-167560 and 2007-316699).

For the above-mentioned priority, Japanese Patent Laid-Open No. 10-167560 has proposed a method to implement transfer corresponding to the priority by central control. However, implementing transfer corresponding to the priority by central control poses a problem in that a control circuit becomes proportionally complicated in according to the increase in the number of modules.

Japanese Patent Laid-Open No. 2007-316699 has proposed a packet transfer method using priority dispersed to each module. More specifically, modules are connected by two ring buses, that is, a data transfer bus and response transfer bus. If a certain module determines that a packet already transferred by the ring bus has priority lower than that of a packet to be transmitted by the module, the module discards the transferred packet, and sends, to the ring bus, the high-priority packet to be transmitted. Since the transferred packet is discarded, the module notifies another module of the loss of the packet by using the response transfer bus. The module notified of the loss retransmits the packet to the transmission source. In this manner, packet transfer corresponding to the priority is implemented.

Unfortunately, each of all the modules must hold the copy of a transmitted packet until it is confirmed that the packet is not discarded by another module. This poses the problem that the capacity of a buffer to hold the copies of transmitted packets increases in proportion to the increase in the number of modules. In addition, when using the two ring buses, that is, the data transfer bus and response transfer bus, packets unavoidably collide against each other in the response transfer bus in principle. Accordingly, each module must include a buffer capable of holding the copy of a transmitted packet, in addition to a buffer for a response packet that cannot be transmitted, by taking account of a delay before this response packet arrives at the transmission source. Even when using only one ring bus, a buffer having a capacity that does not break down even if a retransmission request for discarded data is delayed. That is, the packet transfer efficiency decreases accordingly.

When a packet is transferred according to its priority, data processing in each module is expected to operate based on the priority. However, when a data processing apparatus in which a plurality of modules are connected by a ring bus performs various kinds of processing by freely changing the number and order of modules to be used, packet transfer corresponding to the processing capability of each module is necessary to increase the overall efficiency of data processing.

The present invention has been made in consideration of the above situation, and provides a data processing to increase the packet transfer efficiency of a data processing apparatus by determining the priority of data by a simple mechanism.

SUMMARY OF THE INVENTION

According to one aspect of the present invention, there is provided a data processing apparatus for processing data in a preset order by using a plurality of modules connected to a ring bus, the module comprising: a receiving unit adapted to receive a packet from another module; a determining unit adapted to determine whether to process, by a self-module, data held in the packet received by the receiving unit, based on first information contained in the packet and indicating the order; a processing unit adapted to process the data if the determining unit determines that the data should be processed by the self-module; a generating unit adapted to generate a packet containing the first information, and one of the data processed by the processing unit, and second information indicating that the data to be processed by the processing unit is not processed but stalled; and a transmitting unit adapted to transmit, in accordance with the first information, the packet generated by the generating unit to a module expected to process the packet next, wherein the transmitting unit performs the transmission at a transmission interval longer than a predetermined time, if the first information and the second information indicate that the packet received by the receiving unit contains data which should be processed by a module next to the self-module in processing order and is not processed but stalled.

Further features of the present invention will be apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
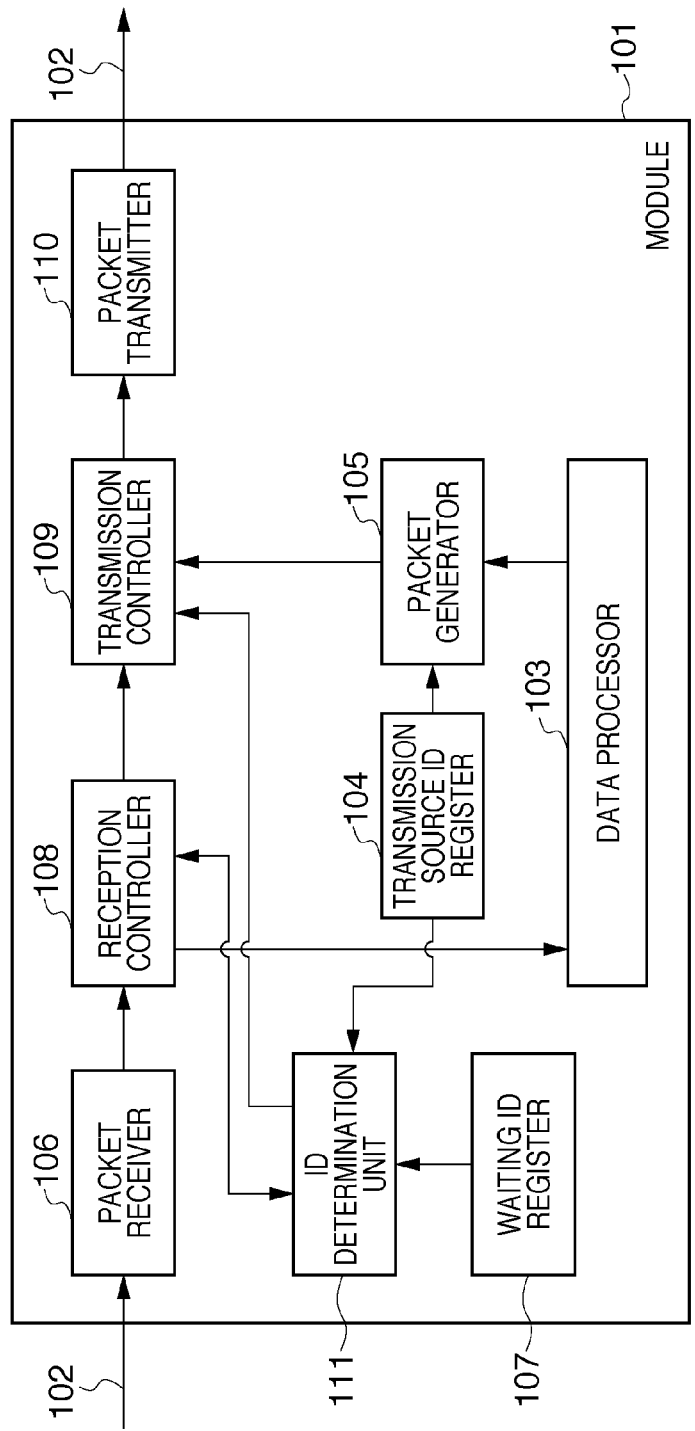
FIG. 1 is a functional block diagram of a data processing apparatus.

A data processing apparatus according to an embodiment will be explained below with reference to FIG. 1. The data processing apparatus according to this embodiment includes a plurality of modules and a ring bus connecting the modules.

A module 101 is a module for processing data. The module 101 includes a data processor 103, transmission source ID register 104, packet generator 105, packet receiver 106, waiting ID register 107, reception controller 108, transmission controller 109, packet transmitter 110, and ID determination unit 111. A CPU (not shown) controls these units. A ring bus 102 connects the modules 101 in the form of a ring. The data processor 103 performs predetermined data processing. The transmission source ID register 104 is a register in which a transmission source ID (first information) to be added to a packet is set. The packet generator 105 generates a packet to be transferred by the ring bus 102, from data processed by the data processor 103. The packet receiver 106 receives a packet via the ring bus 102. The waiting ID register 107 is a register in which the ID of a packet to be processed by the data processor 103 can be set. The reception controller 108 performs control to send a packet received by the packet receiver 106 to the data processor 103 if data of the packet is processable by the self-module, or transfer the packet to the transmission controller 109 if not. The transmission controller 109 performs control to transmit, to the ring bus 102, a packet holding data processed by the data processor 103 and a packet transferred from the reception controller 108. The packet transmitter 110 transmits a packet to the ring bus 102. The ID determination unit 111 determines the ID of a packet received by the packet receiver 106, the ID of the transmission source ID register 104, and the ID of the waiting ID register 107, and generates control information for the reception controller 108 and transmission controller 109 from these ID values. Note that the ID of a received packet is an ID set by the transmission source ID register 104 of a module earlier than this module in processing order.

The data processing apparatus according to this embodiment has a ring structure in which the modules 101 are connected to the ring bus 102, and the number of modules is not particularly limited. Also, the transmission controller 109 includes a buffer, and the output of the buffer is the input of the next module. One packet is transferred to the next module 101 in one cycle. Each module 101 transfers one packet to the next module 101 in one cycle, so the entire apparatus can transfer data in parallel.

Figure 2:
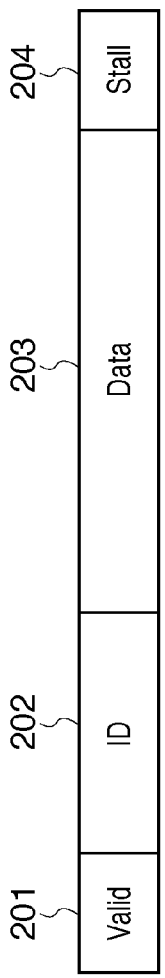
FIG. 2 is a view showing the configuration of a packet.

A packet for use in data transfer between the modules 101 in the data processing apparatus according to this embodiment will be explained below with reference to FIG. 2. The packet includes a valid flag 201, transmission source ID 202 (first information), data 203, and stall flag 204 (second information). The valid flag 201 indicates whether the packet is valid. The transmission source ID 202 is the identifier of the transmission source of the packet, and holds the priority of held data. The data 203 is data held by the packet. The stall flag 204 (second information) indicates that the reception of the data held by the packet is stalled in the transfer destination. A value by which the order relationship between the transmission source module of the packet and a module to be used in processing can be identified is allocated to the transmission source ID 202. This makes it possible to determine the priority of processing of data held by each packet by a simple operation.

Figure 3A:
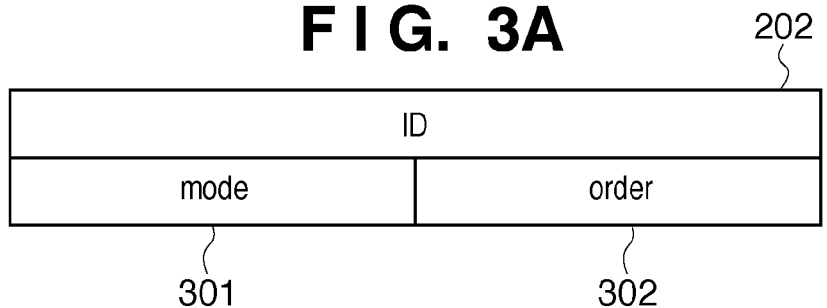
FIGS. 3A and 3B are views showing the configurations of transmission source IDs.
Figure 3B:
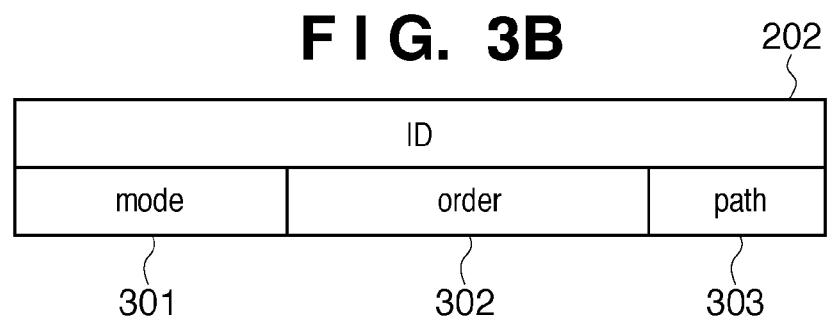

The transmission source ID 202 will be explained in detail below with reference to FIG. 3A. An ascending-order value or descending-order value is added to an order 302 forming the transmission source ID 202, in accordance with the processing order. The value to be added can be any value as long as the order relationship can be determined. To increase the overall processing efficiency of the data processing apparatus, it is favorable to transfer data later in processing order. Therefore, a value by which it is determined that a packet later in processing order has a higher priority is added. However, if it is desirable to add a high priority, regardless of the processing order, to a packet of a module including a processor whose processing performance is a bottle neck among modules to be used, an ID is set by using the field of a mode 301. When an ID is added in this way, the processing order has a value that does not repeat in a series of data processing steps, so the ID can also be used as the identifier of each module. A plurality of data processing steps can be performed in parallel in the data processing apparatus by identifying the paths of the plurality of data processing steps as a path 303 as shown in FIG. 3B. Note that the packet configurations shown in FIGS. 2, 3A, and 3B are merely examples, and the order of the fields is not limited. Also, another field may exist. In particular, the transmission source ID 202 need only have a value by which the order relationship between the transmission source module of the packet and a module to be used in processing can be identified. If the mode 301 is unnecessary, the transmission source ID 202 may include only the order 302.

An operation of transferring packets between the modules of the data processing apparatus will be explained below. First, a packet receiving operation will be explained. The ID determination unit 111 determines whether a packet received by the packet receiver 106 holds data to be processed by the data processor 103 of the self-module 101, or data to be processed by another module. The ID determination unit 111 performs this determination by performing an operation on the ID value of the transmission source ID 202 of the received packet, and the ID value of the waiting ID register 107. For example, the ID determination unit 111 allocates the ID value of the received packet to be processed to that of the waiting ID register, and performs processing if the two IDs match. Note that it is possible to check the match of the whole IDs or only portions of the IDs. The ID determination unit 111 outputs the data to the data processor 103 if the two IDs match, and transfers the packet to the transmission controller 109 if not. However, even when the ID determination unit 111 holds data to be processed by the data processor 103, if the data processor 103 cannot process the data, the ID determination unit 111 determines that the processing is stalled, sets the stall flag 204, and transfers the packet to the transmission controller 109.

An operation by which the data processed by the data processor 103 is transmitted by the packet shown in FIG. 2 to a module expected to process the data next will be explained. The data processed by the data processor 103 is stored in the data 203. The ID value of the transmission source ID register 104 is stored in the field of the transmission source ID 202. The valid flag 201 is validated, and the packet generator 105 generates a packet. The transmission controller 109 controls whether to transmit this packet to the ring bus 102 through the buffer.

Figure 4:
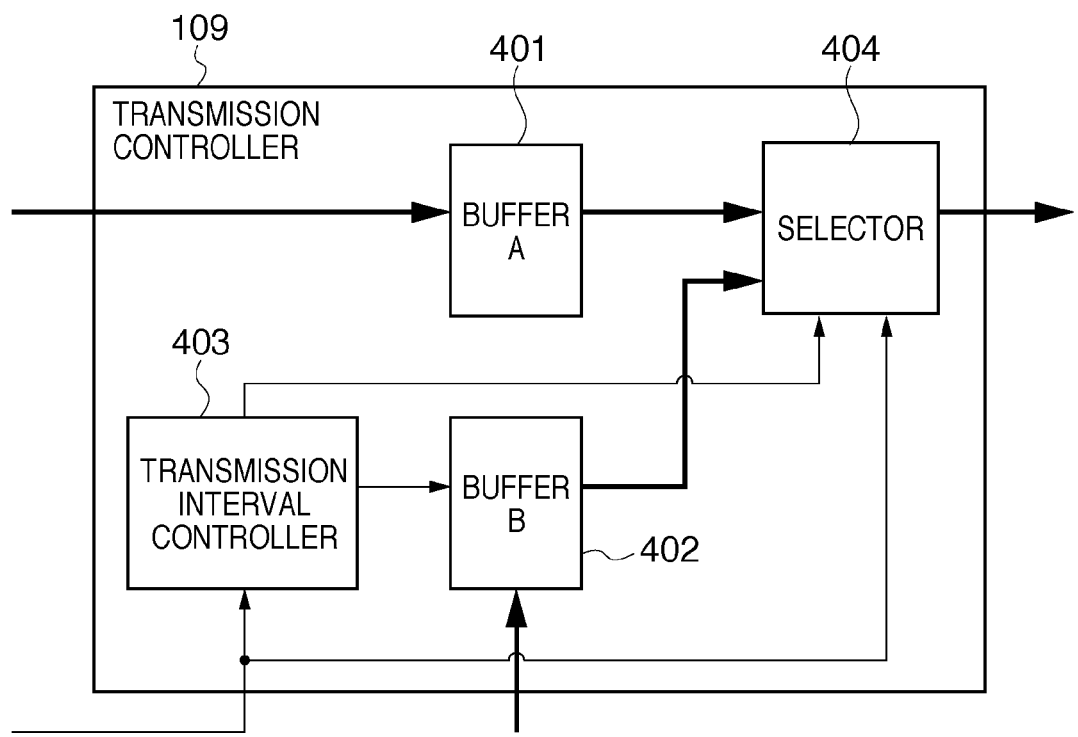
FIG. 4 is a functional block diagram of a transmission controller.

The arrangement of the transmission controller 109 according to this embodiment will be explained below with reference to FIG. 4. A buffer 401 holds a packet from the reception controller 108. A buffer 402 holds a packet generated by the packet generator 105. A transmission interval controller 403 controls the transmission interval of packets from the buffer 402. A selector 404 selects a packet to be transmitted.

The buffer 401 stores a packet transferred from the reception controller 108, or a packet that holds data to be processed by the self-node but cannot be processed by the data processor 103. Whether a packet cannot be processed by the data processor 103 can be identified by the stall flag 204. Also, the buffer 402 stores a packet generated by the packet generator 105 as described above. The selector 404 selects a packet to be transmitted from the packets stored in these two buffers. The transmission interval controller 403 determines whether the packet stored in the buffer 402 can be transmitted. The transmission interval controller 403 includes an internal timer, and resets the timer to a predetermined value whenever a packet is transmitted, thereby ensuring a minimum packet transmission interval. This transmission interval can be set by a register or the like, and a value corresponding to the processing capability of the module 101 later in processing order is set.

In the present invention, the processing order relationship between the transmission source module of the received packet and the self-module can be determined by the transmission source ID 202. It is also possible to detect, by the processing order, which module is in a processing stall state, by checking the stall flag 204 of the received packet. The transmission interval controller 403 can dynamically control the transmission interval from the buffer 402 in accordance with the detection result, thereby increasing the packet transfer efficiency.

An example of the transmission interval control performed by the transmission interval controller 403 will be explained below. First, the transmission interval is set at a predetermined value as an initial state. If the self-module detects that a packet transmitted by a module next to the self-module in processing order is in the stall state, the transmission interval controller 403 sets the transmission interval to a value larger than the time required to go round the ring bus 102 once. This is so because the possibility that the module next to the self-module in order cannot receive a new packet transmitted by the self-module is very high. When the transmission interval is set to a value larger than the time required for a packet to go round the ring bus 102 once, no stall packet of the self-module presumably exists any longer in the ring bus 102 and the next packet is transmitted after that. Note that the time required for a packet to go round the ring bus 102 once is predetermined in accordance with the number of modules connected to the ring bus 102. The time can also be measured by the internal timer of the transmission interval controller 403. (It is also possible to achieve an effect to some extent by using, for example, a time during which a packet passes through a predetermined number of modules, or a predetermined number of clocks, instead of the time required to go round the ring bus 102 once.)

On the other hand, if the self-module detects the stall state in a module later in processing order than the transmission destination (a module next to the self-module in processing order) of the self-module, the possibility that the module next to the self-module in processing order can receive a packet is relatively high. Therefore, the packet is transmitted at a transmission interval smaller than the time required to go round the ring bus 102 once. The transmission interval can also be set equal to or larger than the value set as the initial state. This setting can decrease the number of stall packets of the self-module, which occupy the ring bus 102. Furthermore, packets can be supplied as long as a module later in processing order than the module next to the self-module can receive the packets. If the self-module detects the stall state in a module earlier in processing order than the self-module, the transmission interval need not be changed because processing is not stalled in a module later in processing order.

As described above, the packet transfer efficiency can be increased by dynamically controlling the transmission interval of a packet from the self-module in accordance with the processing states of other modules. That is, the packet transfer efficiency is increased as a whole by suppressing the generation of a packet that goes round the ring bus 102 as a stall packet and interferes with data transmission from each module. Since the packet transfer amount is dynamically controlled in accordance with the data processing capability and processing priority of each module, packet transfer can be controlled even when the data processing capability of a module is not constant but dynamically changes.

In the present invention, the processing order relationship can be determined from the transmission source ID 202, so priority corresponding to the processing order can be added. If a stall packet is detected, therefore, whether a module having transmitted the packet is later in processing order can be determined by a simple operation. In addition, new packets to be transmitted are suppressed. Consequently, a band for a module having a high priority is secured, so the module can transmit packets. This makes it possible to reduce the number of cycles before predetermined data processing is complete, and effectively increase the overall processing efficiency of the data processing apparatus. The feature of this embodiment is that a single ID and the stall flag alone make it possible to transfer packets in accordance with the order for performing the predetermined data processing, and secure the packet transfer band by taking account of the priority of data.

Since only a single ID is necessary, each module having received a packet can determine whether to process the packet by the data processor and determine the priority of the data, by performing an operation on the ID of the received packet and on the set value of the register of the self-module. This not only simplifies the determination mechanism, but also obviates the need to hold the priority of data in a packet in addition to the ID. Alternatively, this obviates the need for a memory required to associate the ID and priority with each module.

The present invention can increase the packet transfer efficiency of a data processing apparatus by determining the priority of data by a simple mechanism.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-288413 filed on Dec. 18, 2009, which is hereby incorporated by reference herein in its entirety.

What is claimed is:

1. A data processing apparatus comprising:
a plurality of modules connected to a ring bus,
at least one of said plurality of modules comprising:
  a receiving unit adapted to receive a packet from another module;
  a determining unit adapted to determine whether to process, by the at least one module, data held in the packet received by said receiving unit, based on first information contained in the packet and indicating the processing order;
  a processing unit adapted to process the data when said determining unit determines that the data should be processed by the at least one module;

a generating unit adapted to generate a packet containing the first information, a field indicating whether the data to be processed is indeed processed, and second information indicating whether the data to be processed is not processed but stalled; and a transmitting unit adapted to transmit, in accordance with the first information, the packet generated by said generating unit to a module next in the processing order, wherein said transmitting unit performs the transmission at a transmission interval longer than a predetermined time, when the first information and the second information indicate that the packet received by said receiving unit contains data which should be processed by the module next in the processing order and is not processed but stalled, wherein said transmitting unit performs the transmission at a transmission interval shorter than a predetermined time, when it is indicated by the first information and the second information that the packet received by said receiving unit contains data which should be processed by a module latter in processing order than the module next in the processing order and is not processed but stalled, and wherein said plurality of modules collaboratively process each packet in a preset processing order.

2. The apparatus according to claim 1, wherein said transmitting unit performs the transmission at a transmission interval shorter than the transmission interval of the module next in the processing order, when the packet received by said receiving unit contains data which should be processed by a module later than the module next in the processing order and is not processed but stalled.

3. The apparatus according to claim 1, wherein said receiving unit transfers the received packet to said transmitting unit, if said determining unit determines that the data should not be processed by the at least one module.

4. A data processing method for a data processing apparatus including a plurality of modules connected to a ring bus, at least one of the plurality of modules performing the steps of:

receiving a packet from another module;

determining whether to process, by the at least one module, data held in the packet received in said receiving step, based on first information contained in the packet and indicating the processing order;

processing the data when it is determined in said determining step that the data should be processed by the at least one module;

generating a packet containing the first information, a field indicating whether the data to be processed is indeed processed, and second information indicating whether the data to be processed is not processed but stalled; and transmitting, in accordance with the first information, the packet generated in said generating step to a module next in the processing order, and wherein the transmission is performed in said transmitting step at a transmission interval longer than a predetermined time, when the first information and the second information indicate that the packet received in said receiving step contains data which should be processed by the module next in the processing order and is not processed but stalled, and wherein said plurality of modules collaboratively process each packet in a preset processing order.

5. A data processing apparatus comprising:
a plurality of modules connected to a ring bus,
at least one of the plurality of modules comprising:
a receiving unit adapted to receive a packet from another module;

a determining unit adapted to determine whether to process, by the at least one module, data held in the packet received by said receiving unit, based on first information contained in the packet and indicating the processing order;

a processing unit adapted to process the data when said determining unit determines that the data should be processed by the at least one module;

a generating unit adapted to generate a packet containing the first information, a field indicating whether the data to be processed is indeed processed, and second information indicating whether the data to be processed is not processed but stalled; and a transmitting unit adapted to transmit, in accordance with the first information, the packet generated by said generating unit to a module next in the processing order, wherein said transmitting unit performs the transmission at a transmission interval longer than a predetermined time which is the time required for a packet to go round the ring bus once, when the first information and the second information indicate that the packet received by said receiving unit contains data which should be processed by the module next in the processing order and is not processed but stalled, and wherein said plurality of modules collaboratively process each packet in a preset processing order.

* * * * *